United States Patent
Schanin et al.

Patent Number: 5,516,391
Date of Patent: May 14, 1996

[54] METHOD AND DEVICE FOR PRODUCTION OF REINFORCED BELT

[75] Inventors: Jonathan Schanin, Haifa; Shmuel Harel, Kibbutz Machanim, both of Israel

[73] Assignee: Fenrir AG, Switzerland

[21] Appl. No.: 957,690

[22] Filed: Oct. 7, 1992

[30] Foreign Application Priority Data

Aug. 17, 1992 [EP] European Pat. Off. ............. 92113984

[51] Int. Cl.⁶ ................ B29C 53/56; B29D 29/00; F16G 1/08
[52] U.S. Cl. ............... 156/137; 156/172; 156/173; 156/431; 156/446; 474/264; 474/265; 474/268
[58] Field of Search .................. 156/137, 139, 156/140, 141, 431, 432, 446, 447, 397, 405.1, 172, 173, 175; 198/847; 474/260, 261, 262, 263, 264, 265, 268

[56] References Cited

U.S. PATENT DOCUMENTS

| | | | |
|---|---|---|---|
| 1,228,792 | 6/1917 | Lear | 156/137 |
| 2,237,178 | 4/1941 | Freeman | 156/173 |
| 2,392,743 | 1/1946 | Johnson | 474/261 |
| 2,630,603 | 3/1957 | Freedlander et al. | 156/137 |
| 4,010,054 | 3/1977 | Bradt | 156/173 |
| 4,016,517 | 12/1977 | Dutton, III et al. | 156/304 |
| 4,211,594 | 7/1980 | Freitag | 156/158 |
| 4,231,836 | 11/1980 | Ljungqvist et al. | 156/397 |
| 4,253,836 | 3/1981 | Miranti | 474/262 |
| 4,414,047 | 11/1983 | Wetzel | 156/138 |
| 4,415,397 | 11/1983 | Wetzel | 156/447 |
| 4,878,984 | 11/1989 | Bourrieres | 156/169 |
| 4,909,878 | 3/1990 | Watanabe | 156/446 |
| 5,129,866 | 7/1992 | Schanin et al. | 474/264 |

FOREIGN PATENT DOCUMENTS

| | | | |
|---|---|---|---|
| 1479232 | 6/1969 | Germany. | |
| 1650659 | 11/1970 | Germany. | |
| 1775609 | 7/1973 | Germany | 198/847 |
| 2316749 | 5/1974 | Germany. | |
| 4016367 | 11/1990 | Germany. | |
| 1153146 | 5/1981 | U.S.S.R.. | |
| 25621 | 4/1908 | United Kingdom | 156/397 |
| 7403 | 4/1993 | WIPO. | |

*Primary Examiner*—Steven D. Maki
*Attorney, Agent, or Firm*—William Squire

[57] ABSTRACT

The present invention provides an endless belt including a reinforcing load-carrying layer which is constituted by an even number of cord-like load-carrying members (5, 6). The load-carrying members extend within the load carrying member having a load-carrying layer in a plurality but at least more than one full turn each. In order to balance unbalanced force components produced by the load-carrying members having a pitch angle, the load-carrying members are arranged in pairs. Each load-carrying member would in one transverse direction has a corresponding load-carrying member wound in the opposite transverse direction within they load-carrying layer. Only within the same longitudinal transition zone (A) of the load-carrying layer the load carrying members form a pitch angle each with respect to the longitudinal direction of the belt.

4 Claims, 5 Drawing Sheets

METHOD AND DEVICE FOR PRODUCTION OF REINFORCED BELT

TECHNICAL FIELD

The present invention relates to an endless belt including a reinforcing load-carrying layer, and to a method for producing such a belt. It further relates to a device for carrying out such method.

DESCRIPTION OF THE PRIOR ART

U.S. Pat. No. 4,414,047 (Wetzel et al.) and U.S. Pat. No. 4,415,397 (Wetzel) provide a load-carrying layer by helically winding a cord-like load-carrying member on an elastomeric base. The pitch angle formed by the winding produces an unbalanced force component in the belt perpendicular to the direction of motion of the belt. This perpendicular force-component is countered by the driver and driven wheels or pulleys, thus inducing wear and reducing belt life and efficiency.

German Patent 40 16 367 (Schanin et al.) discloses a method for producing reinforced belts using preformed load-carrying members having a cord embedded in a solid but softenable elastic material. In one embodiment a load-carrying layer is provided by winding a load-carrying member parallel to the elastomeric base and intended motion, and stepping sideways with the load-carrying member just prior to the completion of each turn. This method provides an essentially balanced belt, but still suffers from an unbalanced transition area due to the sideward steps. Again this design produces an unbalanced force component in the belt, though limited to the transition area, perpendicular to the direction of rotation, and suffers from the limitations above.

A better solution to this problem is known from Soviet Inventions Illustrated, section Q64, week 8545, Dec. 6, 1985, access no. 85-281833/45, Derwent Publications Ltd., London, GB, & SU,A,1153146 (ODESS POLY) Apr. 30, 1985. This publication shows a belt with two cord-like load-carrying members which are laid inside the belt on the same level, with one load-carrying member wound in a left-hand spiral laid on one side of the belt's lengthwise axis, and the other load-carrying member with a right-hand spiral on the other side. When the belt is in operation it is not pressed against the pulley flange since the lateral efforts caused by the angle of one load-carrying member is balanced by that of the other. A similar structure is also known from DE,A1,1650695 (CONTINENTAL GUMMI).

U.S. Pat. No. 2,983,637 (SCHMIDT) shows a belt with two load-carrying members wound in two layers in opposite directions to form helices having an opposite inclination or pitch so that the longitudinal pull or tension is again balanced and the tendency of the belt to creep sidewise is eliminated.

SUMMARY OF THE INVENTION

Extending in an endless longitudinal direction: and a load carrying layer extending in the longitudinal direction about the body and comprising an even number of load-carrying members. A first of the load carrying members longitudinally extend within the load-carrying layer about the body from a first load-carrying member outer end to a first inner end and in at least more than one full turn about the body wherein adjacent portions of the at least one turn are displaced in a first direction transverse the longitudinal direction and a second of the load-carrying members longitudinally extend within the load-carrying layer about the body from a second load-carrying member outer end to a second inner end in at least more than one full turn about the body wherein adjacent portions of the latter at least one turn are displaced in a second direction transverse the longitudinal direction opposite the first transverse direction. Each load-carrying member having a pitch angle inclined in a corresponding transverse direction with respect to the longitudinal direction, each pitch angle forming a transition, each transition having a limited longitudinal extent, all of the transitions lying in the same longitudinal region of the body forming a transition zone of limited longitudinal extent in the longitudinal direction. Each load-carrying member extending parallel to the longitudinal direction outside the transition zone, the load-carrying members being arranged in mirror image symmetrical pairs such that each load-carrying member whose at least one turn traverses in one transverse direction has a corresponding load-carrying member whose at least one turn traverses in the opposite transverse direction within the load-carrying layer.

A method for producing an endless belt including a body and a load-carrying layer comprises the step of longitudinally winding about the body at least one first load-carrying member in a first transverse direction and an equal number of at least one second load-carrying member in at least more than one full turn about the body wherein adjacent portions of the at least one turn are displaced in a first direction transverse the longitudinal direction with a pitch angle with respect to the longitudinal direction of the belt within the same limited longitudinal transition zone and parallel to the longitudinal direction outside the transition zone wherein the transition portions of the members in the transition zone extend in mirror image opposite transverse direction.

In a further embodiment the turns of the load-carrying members are bonded onto an endless base member and to one another during winding by applying heat during winding to the points at the belt building pulley where the load-carrying members first contact the endless base member and applying mutual pressure between the endless base member and the load-carrying members by pressing the load-carrying members onto the endless base member during winding at the points with corresponding guiding wheels for each of the load-carrying members and for guiding the load-carrying members during winding.

BRIEF DESCRIPTION OF THE DRAWINGS

Preferred embodiments will now be described in more detail with reference to the following illustrative figures, In the drawings.

DESCRIPTION OF THE PREFERRED EMBODIMENTS

Figure 1:
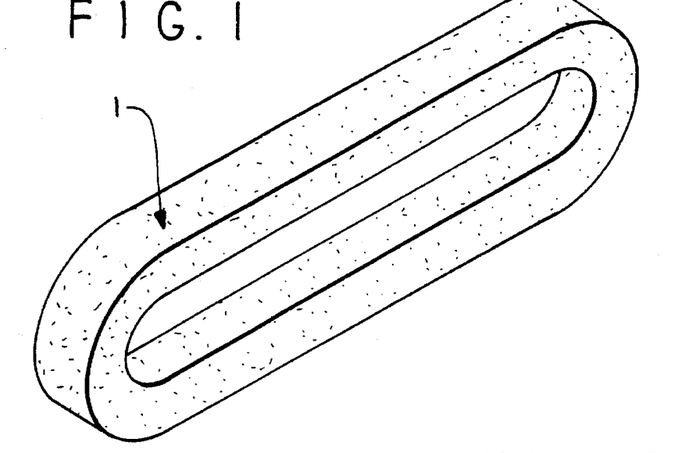
FIG. 1 is a perspective view showing an endless belt.

FIG. 1 shows an endless belt 1 in general. The drive belt of FIG. 2 comprises a body-member 2, known in the art as compression member, a load-carrying layer 3 composed of several turns each of an even number of cord-like load-carrying members, and a tension member 4. For the body-member 2 and the tension member 4 preferably elastomeric materials such as thermoplastic materials are used. The load-carrying members are preferably made of synthetic cord such as polyesther or aramid. The body-member 2, the turns of the load-carrying members and the tension member 4 are firmly bonded together. The bonding may be achieved by the methods as described in the above mentioned German Patent 40 16 367. The disclosure of these methods is incorporated herein by reference.

Figure 2:
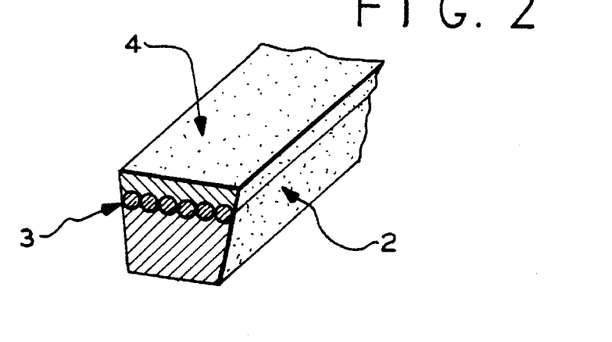
FIG. 2 is a perspective view showing the cross section of an endless drive belt including a load-carrying layer.
Figure 3:
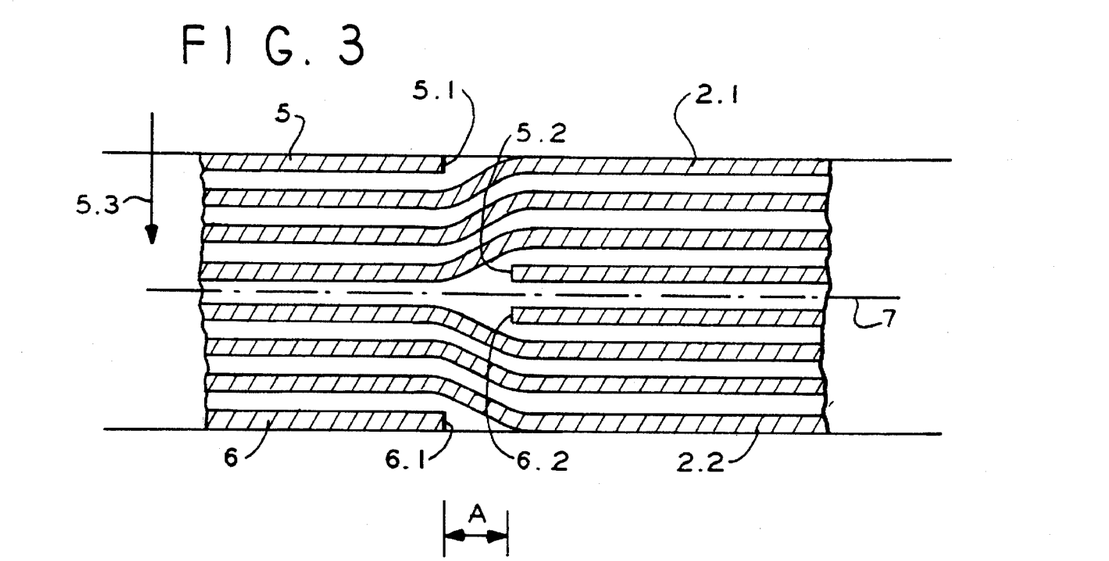
FIG. 3 is a partial section of a load-carrying layer of a belt according to the invention.
Figure 4:
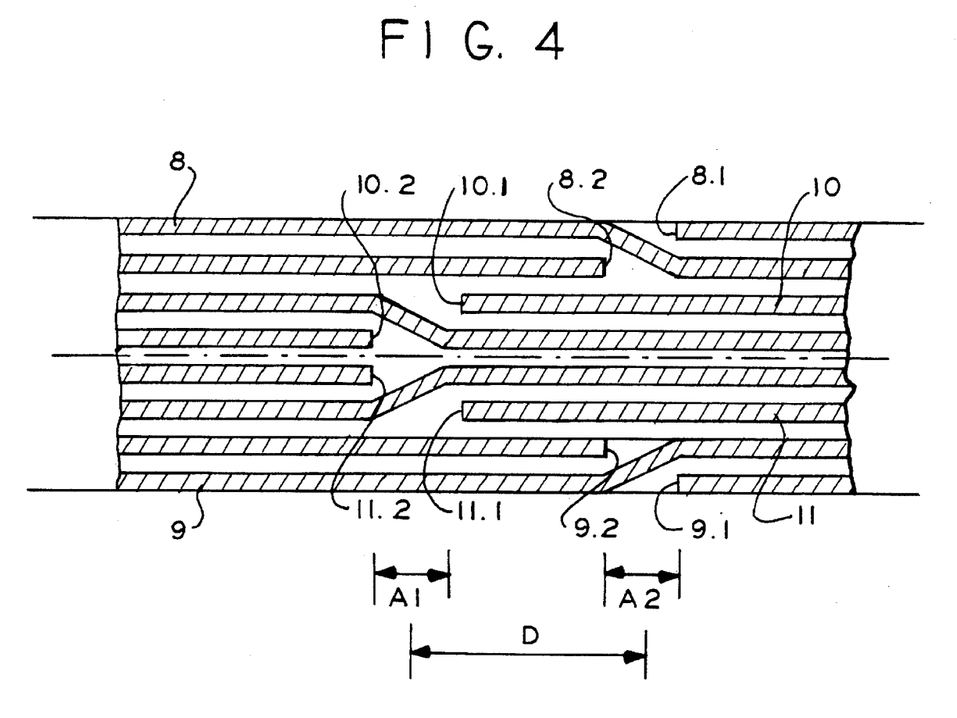
FIG. 4 is a partial section of a load-carrying layer of yet another belt according to the invention.

The load-carrying layer 3 of the belt as shown in FIG. 2 may be of the type as shown in FIG. 3 or 4. Other configurations are, however, possible and will also be explained in the following.

In the embodiment shown in FIG. 3 just one pair of two load-carrying members 5 and 6 with inner ends 5.2, 6.2 and outer ends 5.1, 6.1 extend within the load-carrying layer in almost four full turns each. Load-carrying member 5 extends in a first transverse sense in direction 5.3 from end 5.1 in the orientation of FIG. 3 while load-carrying member 6 extends in the opposite transverse sense from end 6.1. In both embodiments the two load-carrying members 5 and 6 are arranged symmetrically with respect to central line 7 which longitudinally extends in the middle of the transverse width of body-member 2. The two load-carrying members 5 and 6 form two mirror image halves. Both load-carrying members 5, 6 form a pitch angle and an offset with respect to the central line 7 only within the same limited longitudinal transition zone A of the load-carrying layer. Outside of zone A the turns of the load carrying members 5 and extend parallel to central line 7. Compared with the known configurations in which the load-carrying members are helically wound and form a constant pitch angle with respect to central line 7 the configuration of FIG. 3 results in a greater effective length of the two load-carrying members 5 and 6 and thus in a stronger the belt. An enhancement of the effective length of the load-carrying members of 10–25% can easily be achieved.

Another important feature of the embodiment shown in FIG. 3 is that the outer ends 5.1 and 6.1 of load-carrying members 5 and 6 are located outside of transition zone A so that both load-carrying members 5 and 6 at respective ends 5.1 and 6.1 terminate end straight and parallel to central line 7 and to the outer edges 2.1 and 2.2 of body-member 2. Load-carrying members 5 and 6 do not run out of the width of body member 2 but fully remain within that width. They therefore do not need to be sliced along the outer edges 2.1 and 2.2. This slicing of body member 2 as is required and unavoidable over a considerable length in the known configurations in which the load-carrying members are helically wound and do run out of the width of body-member 2 under a very small pitch angle with respect to central line 7.

A method is provided for producing an endless belt extending in a given longitudinal direction, the belt having a first transverse width and including an endless base member and a load-carrying layer, the endless base member comprising softenable solid elastic material, the member having a surface with a second transverse width different than the first width and a center line along the longitudinal direction in the middle of the second width, the load-carrying layer comprising at least two load-carrying members, each load carrying member having first and second ends and each comprising a cord, each of which is eased in a coating envelope comprising a softenable solid elastic material. The method comprises the steps of:

mounting the endless base member on a device including a belt-building pulley having a groove profile which matches the flat and second widths;

winding the load-carrying members starting from the first ends thereof onto the surface of the endless base member over the entire width thereof in several turns each with the adjacent turns of each load-carrying member in direct contact with each other, simultaneously, in mirror image symmetry with respect to the center line thereof, with a pitch angle with respect to the center line only within a given longitudinal transition zone, and parallel the center line outside of the transition zone; and placing the first and second ends of the lad-carrying members outside the transition zone bonding the turns of the load-carrying members onto the endless base member and to one another during winding by applying heat during winding to the points at the belt building pulley where the load-carrying members first contact the endless base member; and applying mutual pressure between the endless base member and the load-carrying members by pressing the load-carrying members onto the endless base member during winding at the points with corresponding guiding wheels for each of the load carrying members wherein the guiding wheels guide the load carrying members during the winding;

the applying pressure including causing the guiding wheels to always move in opposite linear directions toward and away from the load-carrying members.

When using the method as disclosed above in German Patent 40 16 367 for the production of the belt in which method use is made of preformed load-carrying members with a cord embedded in an elastic material the cord itself will not reach the outer edges of body member 2 but will remain fully embedded in the elastic material even at its outer ends. An additional top cover layer required in the known configurations for the lateral protection of the cord may be omitted in this case with advantage.

It is preferred that the end surfaces at ends 5.1 and 6.1 are oriented normal to the direction of central line 7 or towards the inside of the load carrying layer.

In transition zone A the pitch angle the load-carrying members form with respect to central line 7 should be greater than 45°. A value between 70° and 89° is, however, preferred.

In the embodiment of FIG. 4 the load-carrying layer is constituted by two pairs of load-carrying members 8–11. In such case it is preferred to have the inner ends 8.2–11.2 and the outer ends 8.1–11.1 of both pairs of load-carrying members 8–11 and thereby also the transitional zones A1, A2 longitudinally displaced with respect to each other (displacement D).

In the embodiment shown in FIG. 3 the ends 5.1, 5.2 and 6.1, 6.2 of the load-carrying members 5 and 6 could likewise be displaced with respect to each other.

More than two pairs of load-carrying members could, of course, also be used for producing a balanced belt according to the present invention. This would, however, only be suitable for belts having a relatively large width such as conveyer belts for example.

It is preferred to produce the load-carrying layers according to the present invention by simultaneously winding an even number (preferably just two) of load-carrying members in pairs in mirror symmetry with respect to the central line 7 Of the load-carrying layer in a plurality, but at least more than one full turn each.

Figure 5:
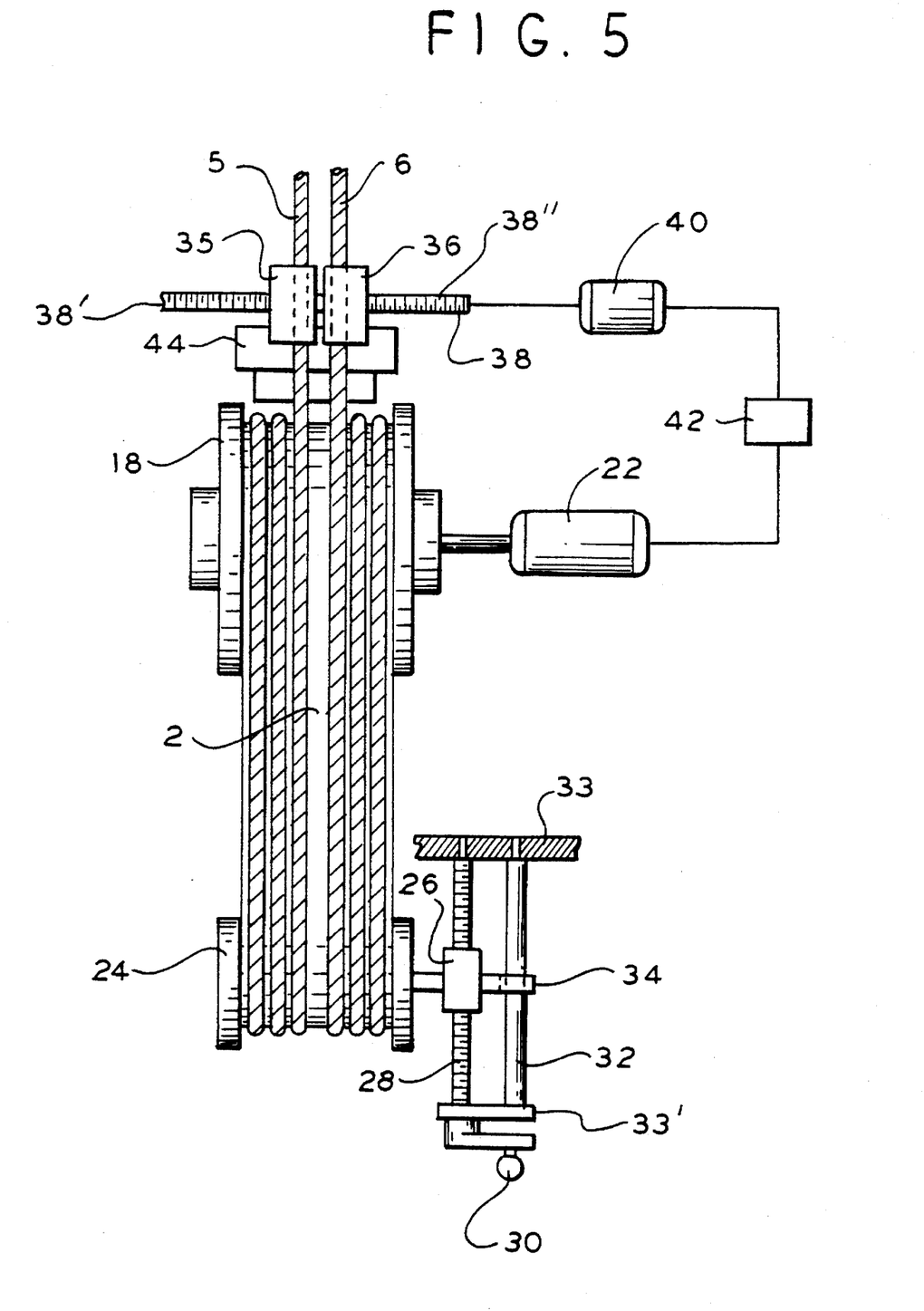
FIG. 5 is a schematic presentation of a device according to the invention.
Figure 6:
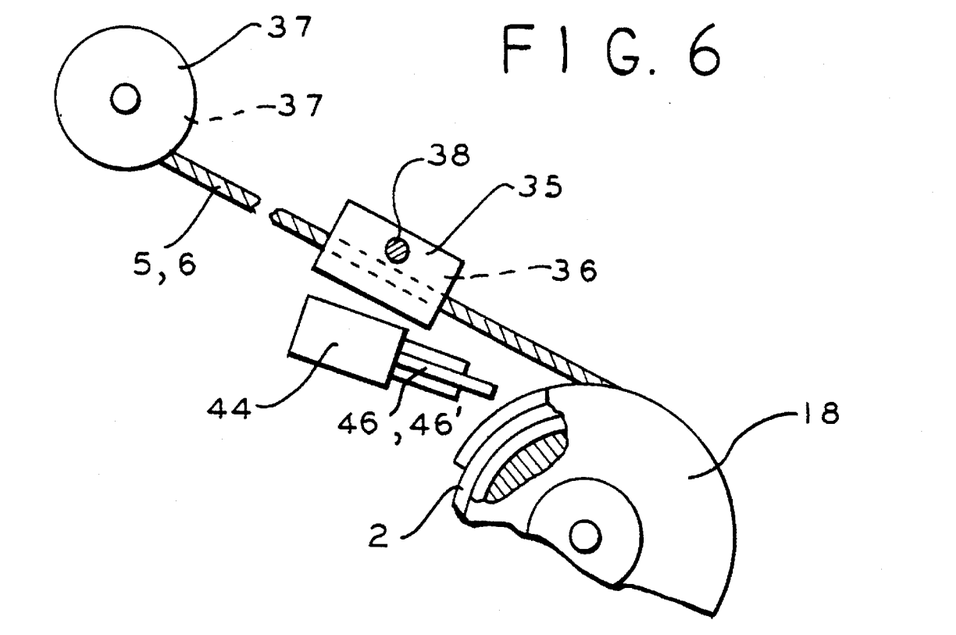
FIG. 6 is a partial side view of the device of FIG. 5.

The device represented in the schematic drawings of FIGS. 5 and 6 is provided with a belt-building or molding pulley 18 the groove profile of which matches the flanks of the compression member 2, and which can be rotated by means of variable-speed gearmotor 22. A second, idler pulley 24 is arranged at a distance from, and in alignment with pulley 18. The idler pulley 24 is rotatably mounted on a block 26 provided with an internal thread and riding on a screw 28 having one degree of freedom in rotation only. Thus, rotating the screw 28 (by means of a handle 30) will cause the block 26, including the idler pulley 24, to perform a translatory movement, permitting the center distance between pulley 18 and the idler pulley 24 to be varied. The bar 32 passing through a fork-like projection 34 attached to the block 26 prevents the latter from rotating about tile screw 28, while allowing the above translatory movement. The screw 28 and the bar 32 are mounted between brackets and 33' which are obviously stationary relative to the idler pulley 24 and its mounting block 26.

Further seen are two guide blocks 35 and 36 through which pass two load-carrying members 5 and 6, drawn off two supply reels 37 and 37' (not shown in FIG. 5, see FIG. 6), on their way to be wound onto the body member 2. The guide blocks 35 and 36 are mounted on a partially left 38' and partially right threaded 38' lead screw 38. The left guide block 35 is provided with an internal left thread. The right guide block 36 is provided with an internal right thread. The lead screw 38 is connected to a variable-speed stepper motor 40, the speed of which can be maintained at a predeterminable ratio relative to the gear-motor 22 driving the molding pulley 18, by means of a control 42. The lead screw 38, when rotated will cause the guide blocks 35 and 36 to perform a translatory movement in opposite directions parallel to its axis.

Mounted below the guide blocks 35, 36 there is provided a blower 44, FIG. 6 producing jets of hot air each with nozzles 46 and 46' (not shown) directed towards the points where the load-carrying members 5 and 6, having passed the guide blocks 35 and 36, make contact with the surface of the body-member 2. The heat is required for the bonding process.

The device as described above is operated as follows: A body-member 2 is mounted on the two pulleys, the molding pulley 18 and the idler pulley 24 which, by turning handle 30 are then moved apart until the endless compression member belt is fairly tight. The forward ends of two load-carrying members 5 and 6 are then drawn off the supply reels 37 and 37', threaded through the respective guide blocks 35 and 36 (which have been set to their initial transversal positions each, i.e. aligned with the respective opposite outer edges 2.1 and 2.2 of body-member 2) and attached to the body-member 2, e.g. by being spot-welded to the surface thereof. The hot-air jets are now turned on and the molding pulley 18 is set rotating by actuating the gear motor 22, setting in motion the body-member 2, and, thereby dragging along the load-carrying members 5 and 6 which, heated by the jets, are bonded to the equally heated (and thereby softened) surface of the body-member 2.

To obtain the configuration of FIG. 3 a synchronous stepping action of the guide blocks 35 and 36 just prior to the completion of each revolution of the body member 2 is required. Such stepping action is controlled by the control 42 which starts lead screw 38 intermittently to rotate, and thereby to carry guide blocks 35 and 36 in several steps in opposite directions. The required relationship between the rotational speed of the pulley 18 and the linear speed of guide blocks 35 and 36 is not only a function of the width of the body-member 2 and the diameter or width of the load-carrying members 5 and 6, but also of the surface speed of the body-member 2, its length and the desired length of the transition zone(s).

In particular when the production methods as disclosed in German Patent 40 16 367 are used, the outer ends of the load-carrying members can be produced by a cutting action carried out right at the completion of the winding thereof.

The configuration of FIG. 4 may be produced in a two step procedure with the device as described here before, or by using multiple guide blocks in a one step procedure.

The application of the tension member 4 follows similarly except that a different guide block is required and that the latter performs no transverse movement, being in fixed alignment with the belt building pulley 18.

Figure 7:
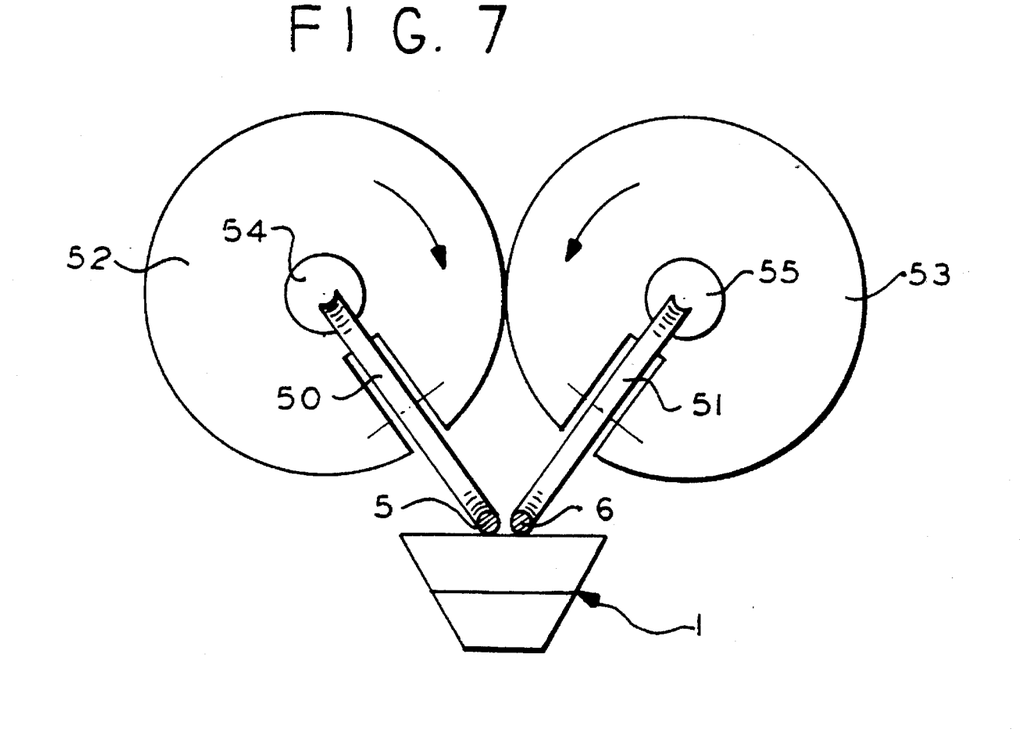
FIG. 7 is a schematic representation of a guiding assembly.

In the device shown in FIG. 5 and 6 it would also be possible to use instead of lead screw 38 and guide blocks 35 and 36 an assembly as shown in FIG. 7. There two guide wheels 50, 51 for the load carrying members 5 and 6 are provided which are rotatably mounted in respective guide blocks 52 and 53. Guide blocks 52 and 53 are mounted also for rotation on fixed axles 54 and 55, the orientation of which is perpendicular to the orientation of lead screw 38 in the embodiments of FIG. 5 and 6. Drive means (not shown) such as the variable speed motor 40 would have to be provided to impart guide blocks 52 and 53 during winding a rotational movement in opposite directions on the axles 54 and 55.

Figure 8:
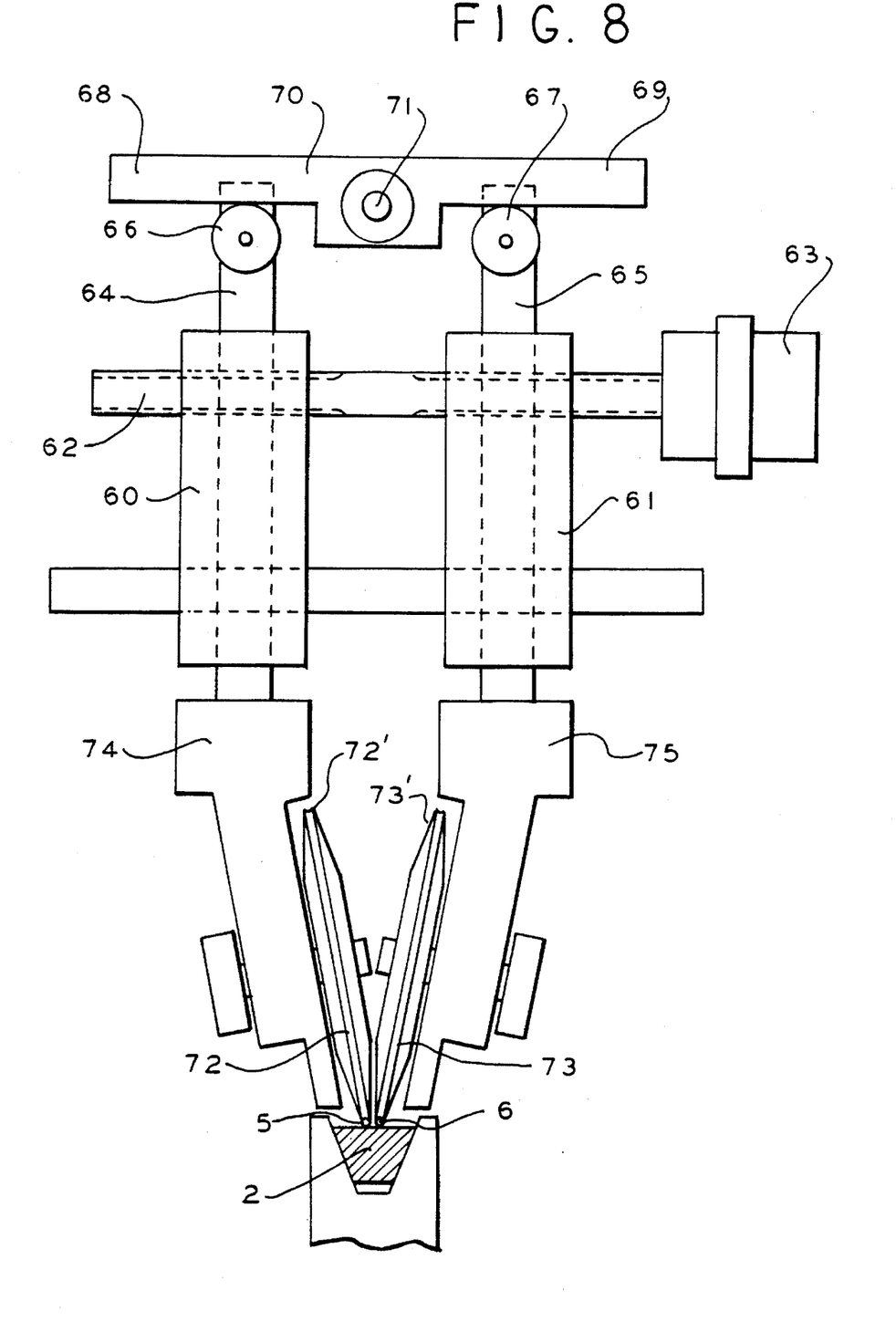
FIG. 8 is a schematic representation of another guiding assembly.

FIG. 8 shows another guiding assembly in which two guiding blocks 60 and 61 are mounted on a partially left and partially right threaded lead screw 62. The left guide block 60 is provided with an internal left and the right guide block 61 with an internal right thread, respectively. The lead screw 62 is connected to a variable speed-stepper motor 63, the operation of which will cause the guide blocks 60 and 61 to perform respective linear translatory transverse movements in opposite directions. Mounted for linear motion up or down in guide blocks 60 and 61 are rods 64 and 65 which are provided with rollers 66, 67 at rod upper ends. The rollers 66, 67 are in rolling contact with the arms 68, 69 of a two-arm lever 70 having its axis at 71. Lever 70 forms a coupling means between rods 64, 65 which forces said rods to always move in opposite directions. At the lower ends of rods 64, 65 two wings 74 and 75 are fixedly mounted which carry guide wheels 72, 73 of the type as shown in FIG. 7 with an inclined orientation with respect to each other. The guide wheels are provided with a circumferential groove for guiding the load-carrying members 5, 6 directly to the body member 2. By guide wheels 72, 73 pressure is exerted to the load-carrying members 5, 6 which are thereby pressed against the upper surface of body-member 2. With the guiding assembly of FIG. 8 it is possible to keep this pressure essentially constant during winding and identical with respect to both load-carrying members 5, 6. This is in particular of importance when use is made from the production method as disclosed in German Patent 40 16 367. That the pressure remains essentially constant during winding is mainly due to the linear movement of guide blocks 60, 61 (instead of a rotational movement thereof as in the assembly shown in FIG. 7). That the pressure exerted on both load-carrying members 5 and 6 keeps identical during winding is mainly due to the coupling levers 70 which for example forces rod 64 to move down and thereby to enhance the pressure on load-carrying member 5 when rod 65 is forced to move up due to an increased variation of the thickness of load-carrying member 6 for example. The inclination of both guiding wheels 72 and 73 has the advantage that the outer edges of both guide wheels 72, 73 come closer to the surface of the body-member 2 than the respective inner edges 72', 73', thereby allowing the load-carrying members and/or the different turns thereof (when winding is carried out in the outside direction) to be wound very close together and preventing them from slipping out of the guiding groove. No additional securing means are required.

The embodiments given to illustrate the invention describe plain V-belts. It should, however, be understood that the invention is also applicable with other types of belts. In particular drive belts such as V-belts, variable speed belts, timing belts, ribbed belts and flat belts or flat or profiled conveyer belts may be utilized in the alternative.

We claim:

1. A method for producing an endless belt extending in a given longitudinal direction, said belt having a first transverse width and including an endless base member and a load-carrying layer, said endless base member comprising softenable solid elastic material, said member having a surface with a second transverse width different than said first width and a center line along said longitudinal direction in the middle of said second width, said load-carrying layer comprising at least two load-carrying members, each load carrying member having first and second ends and each comprising a cord, each of which is encased in a coating envelope comprising a softenable solid elastic material; said method comprising the steps of:

mounting said endless base member on a device including a belt-building pulley having a groove profile which matches said first and second widths;

winding said load-carrying members starting from said first ends thereof onto said surface of said endless base member over the entire width thereof in several turns each with the adjacent turns of each load-carrying member in direct contact with each other, simultaneously, in mirror image symmetry with respect to the center line thereof, with a pitch angle with respect to said center line only within a given longitudinal transition zone, and parallel said center line outside of said transition zone; and placing said first and second ends of said load-carrying members outside said transition zone;

bonding said turns of said load-carrying members onto said endless base member and to one another during winding by applying heat during winding to the points at said belt building pulley where the load-carrying members first contact the endless base member; and applying mutual pressure between said endless base member and said load-carrying members by pressing said load-carrying members onto the endless base member during winding at said points with corresponding guiding wheels for each of said load carrying members wherein the guiding wheels guide the load carrying members during the winding;

said applying pressure including causing the guiding wheels to always move in opposite linear directions toward and away from the load-carrying members.

2. A device for producing an endless belt comprising:

a rotatable belt building pulley having a width the same as the width of a single belt body;

first drive means for rotating said belt building pulley about a first axis;

an idler pulley aligned with said belt building pulley and at a variable distance therefrom for rotating about a second axis parallel to the first axis;

means to adjust the variable distance;

a pair of guide means including guide blocks transversely displaceable along said belt width in opposite transverse directions for synchronously guiding at least one pair of load-carrying members during winding thereof on said body in said opposite directions;

second drive means for imparting to said guide means a transverse movement intermittently during rotation of said belt building pulley in a direction parallel to said axes of rotation;

compression means transversely displaceable along said belt width for compressing the pair of load carrying members against said body during the guiding; and control means to control the transverse movement of said compression means and the speed of said guide means such that said guide means is moved just prior to the completion of each full revolution of the winding of each turn of the load-carrying member on the body for a given period of time to provide a stepwise transverse movement of said guide means during a portion of each said turn;

said compression means comprising guide wheels and intermediate elements, the guide wheels each being provided with a circumferential groove for receiving a different corresponding one of the load-carrying members;

the intermediate elements comprising rods linearly movable within a different corresponding one of the guide blocks, wherein the guide wheels are each rotatably fixed to a corresponding different one of said movable rods and further including coupling means for coupling the rods such that they always move within the corresponding guide blocks in opposite directions.

3. A device for producing an endless belt including an endless base having a width, said device comprising:

a belt building pulley for carrying said base and having a width the same as the width of the base;

first drive means for rotating said belt building pulley about a first axis;

an idler pulley for carrying said base and rotatable about a second axis parallel to the first axis and aligned with said belt building pulley and at a variable distance therefrom;

means to adjust said variable distance;

a hot air nozzle for applying a stream of hot air to the belt building pulley for heating load carrying members and said carried base;

guide means including guide blocks for synchronously guiding a pair of load-carrying members during winding of the members on the base;

second drive means for imparting to said guide means a movement intermittently during rotation of said belt building pulley in a transverse direction parallel to said axes; and control means for controlling the movement of said guide means such that said guide means is moved in aid traverse direction just prior to the completion of each full revolution of the endless bag mounted on the belt building pulley and the idler pulley for a given period of time so that the transverse movement is completed before the time required for said one full revolution in order to provide a stepwise translatory movement of said guide means in said transverse direction;

a pair of guide wheels and intermediate elements, each wheel having a circumferential groove for receiving a different corresponding respective load-carrying member, said guide wheels each being rotatably secured to a corresponding intermediate element with an inclined orientation with respect to each other; and said guide wheels being arranged at the belt building pulley such that they press the respective load-carrying members onto the endless base member during winding thereof while said base and load carrying members are heated by said hot airstream;

the guide means comprising a partially left and partially right threaded lead screw rotationally driven the second drive means;

said guide blocks including a left guide block with an internal left thread mounted on the left threaded part of the lead screw and a right guide block with an internal right thread mounted on the right threaded part of the lead screw;

the intermediate elements comprising rods linearly movable within a different corresponding one of the guide blocks, the guide wheels being each rotatably fixed to a corresponding different one of said movable rods and further including coupling means for coupling the rods such that they always move within the corresponding guide blocks in opposite directions.

4. A device for producing an endless belt including an endless base having a width, said device comprising:

a belt building pulley for carrying said base and having a width the same as the width of the base;

first drive means for rotating said belt building pulley about a first axis;

an idler pulley for carrying said base and rotatable about a second axis parallel to the first axis and aligned with said belt building pulley and at a variable distance therefrom;

means to adjust said variable distance;

a hot air nozzle for applying a stream of hot air to the belt building pulley for heating load carrying members and said carried base;

guide means including guideblocks for synchronously guiding a pair of load-carrying members during winding of the members on the base;

second drive means for imparting to said guide means a movement intermittently during rotation of said belt building pulley in a transverse direction parallel to said axes; and control means for controlling the movement of said guide means such that said guide means is moved in said traverse direction just prior to the completion of each full revolution of the endless base mounted on the belt building pulley and the idler pulley for a given period of time so that the transverse movement is completed before the time required for said one full revolution in order to provide a stepwise translatory movement of said guide means in said transverse direction;

a pair of guide wheels each having a circumferential groove for receiving and guiding a different corresponding respective load-carrying member; and wherein said guide wheels are arranged at the belt building pulley such that they press the respective received load-carrying members onto the endless base member during winding thereof while said base and load carrying members are heated by said hot airstream;

a pair of linearly movable rods with each guide wheel rotatably fixed to a corresponding different one of the pair of the rods, each rod passing through a corresponding one of the guide blocks, and coupling means coupled to the rods for causing the rods and guide wheels to always move in opposite linear directions.

* * * * *

UNITED STATES PATENT AND TRADEMARK OFFICE
CERTIFICATE OF CORRECTION

PATENT NO. : 5,516,391

DATED : May 14, 1996

INVENTOR(S) : Jonathan Schanin et al.

It is certified that error appears in the above-indentified patent and that said Letters Patent is hereby corrected as shown below:

In the abstract, line 9, change "would" to --wound--.

Column 1, line 58, delete "extending" and replace with --An endless belt according to the present invention comprises an endless body extending--.

Column 2, line 45, insert

--A method for producing an endless belt extending in a given longitudinal direction, said belt having a first transverse width and including an endless base member and a load-carrying layer, said endless base member comprising softenable solid elastic material, said member having a surface with a second transverse width different than said first width and a center line along said longitudinal direction in the middle of said second width, said load-carrying layer comprising at least two load-carrying members, each load carrying member having first and second ends and each comprising a cord, each of which is encased in a coating envelope comprising a softenable solid elastic material; said method comprising the steps of:

mounting said endless base member on a device including a belt-building pulley having a groove profile which matches said first and second widths;

winding said load-carrying members starting from said first ends thereof onto said surface of said endless base member over the entire width thereof in several turns each with the adjacent turns of each load-carrying member in direct contact with each other, simultaneously, in mirror image symmetry with respect to the center line thereof, with a pitch angle with respect to said center line only within a given longitudinal transition zone, and parallel said center line outside of said transition zone; and

UNITED STATES PATENT AND TRADEMARK OFFICE
CERTIFICATE OF CORRECTION

PATENT NO. : 5,516,391
DATED : May 14, 1996
INVENTOR(S) : Jonathan Schanin et al.

It is certified that error appears in the above-indentified patent and that said Letters Patent is hereby corrected as shown below:

placing said first and second ends of said load-carrying members just outside said transition zone; said winding and placing including bonding said turns of said load-carrying members onto said endless base member and to one another during winding by applying heat during winding to the points at said belt building pulley where the load-carrying members first contact the endless base member; and applying mutual pressure between said endless base member and said load-carrying members by pressing said load-carrying members onto the endless base member during winding at said points with corresponding guiding wheels for each of said load carrying members wherein the guiding wheels guide the load carrying members during the winding;

said applying pressure including causing the guiding wheels to always move in opposite linear directions toward and away from the load-carrying members--.

UNITED STATES PATENT AND TRADEMARK OFFICE
CERTIFICATE OF CORRECTION

PATENT NO. : 5,516,391

DATED : May 14, 1996

INVENTOR(S) : Jonathan Schanin et al.

It is certified that error appears in the above-indentified patent and that said Letters Patent is hereby corrected as shown below:

Column 3, line 5, before "compression" insert --a--;
      line 43, delete "the" before "belt";
      line 50, delete "end".

Column 4, line 3, change "eased" to --encased--;
      line 8, change "fiat" to --first--;
      line 18, change "lad" to --load--.

Column 5, line 19, change "tile" to --the--;
      line 21, after "brackets" insert --33--.

Column 6, line 27, delete "also".

Column 8, line 66, change "aid" to --said--.

Column 9, line 19, after "driven" insert --by--.

Signed and Sealed this

Seventeenth Day of December, 1996

Attest:

BRUCE LEHMAN

*Attesting Officer*      *Commissioner of Patents and Trademarks*